United States Patent
Klingenbrunn et al.

(10) Patent No.: US 9,698,927 B2
(45) Date of Patent: Jul. 4, 2017

(54) METHODS AND APPARATUS FOR EMPLOYING DIFFERENT CAPABILITIES FOR DIFFERENT DUPLEXING MODES

(71) Applicant: QUALCOMM Incorporated, San Diego, CA (US)

(72) Inventors: Thomas Klingenbrunn, San Diego, CA (US); Lorenzo Casaccia, Rome (IT); Bhupesh Manoharlal Umatt, Poway, CA (US); Pradeep Sagane Gowda, San Diego, CA (US); Daniel Amerga, San Diego, CA (US); Shyamal Ramachandran, San Diego, CA (US); Muralidharan Murugan, San Diego, CA (US); Swaminathan Sureshchandran, San Diego, CA (US); Dinesh Dharmaraju, San Diego, CA (US); Sudhir S. Halbhavi, Bangalore (IN); Vitaly Drapkin, San Diego, CA (US); Raghu Narayan Challa, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/968,189

(22) Filed: Dec. 14, 2015

(65) Prior Publication Data
US 2016/0099788 A1    Apr. 7, 2016

Related U.S. Application Data

(62) Division of application No. 13/406,344, filed on Feb. 27, 2012, now Pat. No. 9,264,198.
(Continued)

(51) Int. Cl.
*H04J 4/00* (2006.01)
*H04L 5/00* (2006.01)
(Continued)

(52) U.S. Cl.
CPC ............ *H04J 4/005* (2013.01); *H04L 5/0053* (2013.01); *H04W 8/245* (2013.01); *H04W 76/02* (2013.01); *H04W 76/06* (2013.01)

(58) Field of Classification Search
None
See application file for complete search history.

(56) References Cited

U.S. PATENT DOCUMENTS 7,706,308 B2    4/2010  Yun et al.
7,962,161 B1    6/2011  Giallorenzi et al.
(Continued)

FOREIGN PATENT DOCUMENTS

CN    101917705 A    12/2010
EP    1503610 A2    2/2005
(Continued)

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 10)", 3GPP Standard; 3GPP TS 36.331, 3rd Generation Partnership Project (3GPP), Mobile Competence Centre ; 650, Route Des Lucioles ; F-06921 Sophia-Antipolis Cedex ; France, No. V10.0.0, Dec. 19, 2010 (Dec. 19, 2010) pp. 1-276, XP050462133, [retrieved on Dec. 19, 2010] paragraphs [5.3.3.1], [5.3.4.1].
(Continued)

*Primary Examiner* — Adnan Baig
(74) *Attorney, Agent, or Firm* — Ashish L. Patel

(57) ABSTRACT

Certain aspects of the present disclosure propose techniques for independently signaling features supported by a user
(Continued)

equipment (UE) in different duplexing modes. The UE may be capable of communicating in frequency division duplexing (FDD) and time division duplexing (TDD) modes. The UE may obtain a FDD-specific feature group indicators (FGIs) set and a TDD-specific FGIs set, and signal at least one of the FDD-specific FGIs set or TDD-specific FGIs set. In addition, the UE may take one or more actions to reduce the likelihood of transitioning to a mode of operation that is different from its current mode of operation.

16 Claims, 6 Drawing Sheets

Related U.S. Application Data

(60) Provisional application No. 61/447,624, filed on Feb. 28, 2011, provisional application No. 61/450,995, filed on Mar. 9, 2011.

(51) Int. Cl.
*H04W 8/24* (2009.01)
*H04W 76/02* (2009.01)
*H04W 76/06* (2009.01)

(56) References Cited

U.S. PATENT DOCUMENTS

| | | | |
|---|---|---|---|
| 2002/0071480 A1* | 6/2002 | Marjelund | H04W 8/22 375/141 |
| 2004/0203786 A1 | 10/2004 | Ishiguro et al. | |
| 2005/0025093 A1 | 2/2005 | Yun et al. | |
| 2005/0163089 A1 | 7/2005 | Purkayastha et al. | |
| 2007/0232349 A1 | 10/2007 | Jones et al. | |
| 2008/0214193 A1 | 9/2008 | Jeong et al. | |
| 2008/0311926 A1 | 12/2008 | Fischer et al. | |
| 2009/0219875 A1 | 9/2009 | Kwak et al. | |
| 2010/0041384 A1* | 2/2010 | Kazmi | H04W 88/10 455/419 |
| 2010/0103873 A1 | 4/2010 | Buracchini | |
| 2011/0130150 A1 | 6/2011 | Kolding et al. | |
| 2012/0034917 A1 | 2/2012 | Kazmi | |
| 2012/0218922 A1 | 8/2012 | Klingenbrunn et al. | |

FOREIGN PATENT DOCUMENTS

| | | | |
|---|---|---|---|
| JP | 2003284150 A | 10/2003 | |
| JP | 2004236322 A | 8/2004 | |
| JP | 2013102292 A | 5/2013 | |
| KR | EP 1503610 A2 * | 2/2005 | H04L 5/14 |
| WO | WO-2010019087 A1 | 2/2010 | |
| WO | WO-2011005576 A2 | 1/2011 | |

OTHER PUBLICATIONS

Alcatel-Lucent, "IMS emergency call handover from UTRAN to EUTRAN for USIMless UE ", 3GPP Draft; R2-094569 UTRAN to EUTRAN Usimless UEV0 4, 3RD Generationpartnership Project (3GPP), Mobile Competence Centre ; 650, Route Des Lucioles ; F-06921 Sophia-Antipolis Cedex; France, No. Shenzhen, China; 20090817, Aug. 17, 2009 (Aug. 17, 2009), XP050352689,[retrieved on Aug. 17, 2009]A Section 2.3.
Astely D., et al., "LTE: The evolution of mobile broadband," LTE Part II: 3GPP Release 8, IEEE Communications Magazine, IEEE Service Center, Piscataway, US, vol. 47 (4), Apr. 1, 2009 (Apr. 1, 2009), pp. 44-51, XP011281212 ISSN: 0163-6804 DOI: DOI:10. 1109/MCOM.2009.4907406 the whole document.
Clearwire: "Capability handling for dual mode UEs (FDD/TDD) " , 3GPP Draft; R2-115468, 3rd Generation Partnership Project (3GPP), Mobi Le Competence Centre; 650, Route Des Lucioles; F-06921 Sophia-Anti Polis Cedex; France, vol. RAN WG2, No. Zhuhai; 20111010, Oct. 7, 2011 (Oct. 7, 2011), XP050541116, [retrieved on Oct. 7, 2011] the whole document.
International Search Report and Written Opinion—PCT/US2012/026990—ISA/EPO—Aug. 22, 2012.
LG Electronics Inc: "FGI bit 25", 3GPP Draft; R2-113277 FGI Bit for Inter-Frequency Measurements and Reporting, 3rd Generation Partnership Project (3GPP), Mobi Le Competence Centre; 650, Route Des Lucioles; F06921 Sophia-Anti Polis Cedex; France, vol. RAN WG2, No. Barcelona, Spain; 20110509, May 3, 2011 (May 3, 2011), XP050495420, [retrieved on May 3, 2011] the whole document.
"LTE; Evolved Universal Terrestrial Radio Access (E-UTRA); User Equipment (UE) conformance specification; Radio transmission and reception; Part 2: Implementation Conformance Statement (ICS) (3GPP TS 36.521-2 version 9.3.0 Release 9)", Tecnical Specification, European Telecommunications Standards Institute (ETSI), 650, Route Des Lucioles; F-06921 Sophia-Anti Polis; France, vol. 3GPP RAN 5, No. V9.3.0, Jan. 1, 2011 (Jan. 1, 2011), XP014062180, Annex A—4.4 Feature Group Indicators.
Partial International Search Report—PCT/US2012/026990—ISA/EPO—Jun. 8, 2012.
Qualcomm Incorporated: "Capability reporting for dual mode UEs (FDD/TDD)", 3GPP Draft; R2-115376_FDD_TDD_Capabilities, 3rd Gene Ration Partnership Project (3GPP), Mobile Competence Centre; 650, Route Des Lucioles; F-06921 Sophia-Antipolis Cedex; France, vol. RAN WG2, No. Zhuhai; Oct. 10, 2011, Oct. 4, 2011 (Oct. 4, 2011), XP050541048, [retrieved on Oct. 4, 2011] the whole document.
Qualcomm Incorporated: "Separate UE capability for FDD and TDD", 3GPP Draft; R2-113059, 3rd Generation Partnership Project (3GPP), Mobi Le Competence Centre; 650, Route Des Lucioles; F-06921 Sophia-Anti Poli S Cedex; France, vol. RAN WG2, No. Barcelona, Spain; May 9, 2011, May 2, 2011 (May 2, 2011), XP050495134, [retrieved on May 2, 2011] the whole document.
Qualcomm Incorporated: "UE capability for FDD and TDD", 3GPP Draft; R2-111868, 3rd Generation Partnership Project (3GPP), Mobile Competence Centre; 650, Route Des Lucioles; F-06921 Sophia-Antipolis Cedex; France, vol. RAN WG2, No. Shanghai, China; Apr. 11, 2011, Apr. 4, 2011 (Apr. 4, 2011), XP050494313, [retrieved on Apr. 4, 2011] the whole document.
Renesas Mobile Europe Ltd: "FGI bit handling for TDD/FDD dual mode UEs", 3GPP Draft; R2_115117 TDD_FDD_FGI_BIT_Discussion, 3rd Generation Partnership Projet (3GPP), Mobile Competence Centre; 650, Route Des Lucioles; F-06921 Sophia-Antipolis Cedex; France, vol. RAN WG2, No. Zhuhai; Oct. 10, 2011, Oct. 3, 2011 (Oct. 3, 2011), XP050540756, [retrieved on Oct. 3, 2011] the whole document.
Samsung: "Discussion on FGI bit handling for FDD/TDD dual mode UE", 3GPP Draft; R2-114177 FDD_TDD FGI, 3rd Generation Partnership Project (3GPP), Mobile Competence Centre ; 650, Route Des Lucioles; F-06921 Sophia-Anti Polis Cedex; France, vol. RAN WG2, No. Athens, Greece; Aug. 22, 2011, Aug. 16, 2011 (Aug. 16, 2011), XP050539988, [retrieved on Aug. 16, 2011] the whole document.
Samsung: "FGI bit handling for FDD/TDD dual mode UE", 3GPP Draft; 36331_CRXXXX_(REL-10)_R2-114178_FDD TDD FGI, 3rd Generation Partnership-Project (3GPP), Mobile Competence Centre; 650, Route Des Lucioles; F-06921 Sophia-Antipolis Cedex; France, vol. RAN WG2, No. Athens, Greece; Aug. 22, 2011, Aug. 16, 2011 (Aug. 16, 2011), XP050539803, [retrieved on Aug. 16, 2011] the whole document.
Samsung: "FGI bit handling for FDD/TDD dual mode UE: Alternative solution", 3GPP Draft; 36331_CRXXXX_(REL-10)_R2-114179_FDD TDD FGI_Alternative, 3rd-Generation Partnership Project (3GPP), Mobi Le Competence Centre; 650, Route Des Lucioles; F-06921 Sophia-Antipolis Cedex; France, vol. RAN WG2, No. Athens, Greece; Aug. 22, 2011, Aug. 16, 2011 (Aug. 16, 2011), XP050539804, [retrieved on Aug. 16, 2011] the whole document.
Samsung: "Report: [75#32] FGI bit handling for FDD/TDD dual mode UE", 3GPP Draft; R2-115034 75#32 REV1, 3rd Generation Partnership Project (3GPP), Mobile Competence Centre; 650,

(56) References Cited

OTHER PUBLICATIONS

Route Des Lucioles; F-06921 Sophia-Anti Polis Cedex; France, vol. RAN WG2, No. Zhuhai; Oct. 10, 2011, Oct. 6, 2011 (Oct. 6, 2011), XP050541111, [retrieved on Oct. 6, 2011] the whole document.
TSG RAN WG5: "LS on UE support of handovers between LTE FDD and LTE TDD", 3GPP Draft; R5-110838, 3rd Generation Partnership Project (3GPP), Mobile Competence Centre; 650, Route Des Lucioles; F-06921 Sophia-Antipolis Cedex; France, vol. RAN WG5, No. Taipei; Feb. 21, 2011, Feb. 26, 2011 (Feb. 26, 2011), XP050505783, [retrieved on Feb. 26, 2011] the whole document.
ZTE: "Add Applicability for new Multilayer Procedures test case 13.4.1.3", 3GPP Draft; R5-110648, 3rd Generation Partnership Project (3GPP), Mobile Competence Centre; 650, Route Des Lucioles; F-06921 Sophia-Anti Poli S Cedex; France, vol. RAN WG5, No. Taipei; Feb. 21, 2011, Feb. 12, 2011 (Feb. 12, 2011), XP050505523, [retrieved on Feb. 12, 2011] the whole document.
Qualcomm Incorporated : "UE Capability Update without re-attach," 3GPP TSG-SA WG2#88, S2-115003, Nov. 14, 2011.
Samsung : "UE Capability Handling for FDD/TDD UE," 3GPP TSG-RAN WG2#76, R2-116028, Nov. 14, 2011.

\* cited by examiner

METHODS AND APPARATUS FOR EMPLOYING DIFFERENT CAPABILITIES FOR DIFFERENT DUPLEXING MODES

CLAIM OF PRIORITY UNDER 35 U.S.C. §119

This application is a U.S. divisional application of U.S. patent application Ser. No. 13/406,344, entitled "METHODS AND APPARATUS FOR EMPLOYING DIFFERENT CAPABILITIES FOR DIFFERENT DUPLEXING MODES" and filed Feb. 27, 2012, which claims priority to U.S. Provisional Application No. 61/447,624, entitled, "Mechanism to Decouple Feature Support Between Different Duplexing Modes," filed Feb. 28, 2011, and U.S. Provisional Application No. 61/450,995, entitled, "Mechanism to Decouple Feature Support Between Different Duplexing Modes," filed Mar. 9, 2011, both assigned to the assignee hereof, which are hereby expressly incorporated by reference herein.

TECHNICAL FIELD

Certain aspects of the present disclosure generally relate to wireless communications and, more particularly, to systems and methods that may employ different duplexing modes (e.g., time division duplex (TDD) and frequency division duplex (FDD)).

BACKGROUND

Wireless communication systems are widely deployed to provide various types of communication; for instance, voice and/or data can be provided via such wireless communication systems. A typical wireless communication system, or network, can provide multiple users access to one or more shared resources (e.g., bandwidth, transmit power, etc.). For instance, a system can use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Generally, wireless multiple-access communication systems can simultaneously support communication for multiple mobile devices. Each mobile device can communicate with one or more base stations via transmissions on forward and reverse links. The forward link (or downlink) refers to the communication link from base stations to mobile devices, and the reverse link (or uplink) refers to the communication link from mobile devices to base stations.

Current 3$^{rd}$ generation partnership project (3GPP) specifications may define a set of feature group indicators (FGIs), which are signaled by the user equipment (UE) to the network to indicate support or non-support for certain LTE and Inter-Radio Access Technology (I-RAT) features. Examples of such features may include support for handover, measurements on another RAT, and various other features. Based on the signaled FGIs from the UE, the network may not initiate certain procedures towards the UE, since these will not be supported in the UE.

SUMMARY

Certain aspects of the present disclosure provide a method for wireless communications by a user equipment capable of communicating in frequency division duplexing (FDD) and time division duplexing (TDD) modes. The method generally includes obtaining a FDD-specific feature group indicators (FGIs) set and a TDD-specific FGIs set, and signaling at least one of the FDD-specific FGIs set or TDD-specific FGIs set.

Certain aspects of the present disclosure provide a method for wireless communications with a user equipment capable of communicating in frequency division duplexing (FDD) and time division duplexing (TDD) modes. The method generally includes receiving signaling of at least one of a FDD-specific feature group indicators (FGIs) set or a TDD-specific FGIs set, and determining features supported by the UE in at least one of a FDD mode or TDD mode, based on the received signaling.

Certain aspects of the present disclosure provide a method for wireless communications by a user equipment capable of communicating in frequency division duplexing (FDD) and time division duplexing (TDD) modes. The method generally includes obtaining a FDD-specific feature group indicators (FGIs) set and TDD-specific FGIs set, signaling the FGIs set for a current mode of operation by the UE, and taking at least one action designed to reduce likelihood of transitioning to a mode of operation that is different from the current mode of operation.

Certain aspects of the present disclosure provide a method for wireless communications by a user equipment capable of communicating in frequency division duplexing (FDD) and time division duplexing (TDD) modes. The method generally includes obtaining FDD-specific capabilities and TDD-specific capabilities, and sending a request to a base station to perform detach and re-attach procedures when changing from a first mode of operation to a second mode of operation, wherein the capabilities corresponding to the second mode of operation are transmitted to the base station during the re-attach procedure.

Certain aspects of the present disclosure provide an apparatus for wireless communications capable of communicating in frequency division duplexing (FDD) and time division duplexing (TDD) modes. The apparatus generally includes means for obtaining a FDD-specific feature group indicators (FGIs) set and a TDD-specific FGIs set, and means for signaling at least one of the FDD-specific FGIs set or TDD-specific FGIs set.

Certain aspects of the present disclosure provide an apparatus for wireless communications with a user equipment capable of communicating in frequency division duplexing (FDD) and time division duplexing (TDD) modes. The apparatus generally includes means for receiving signaling of at least one of a FDD-specific feature group indicators (FGIs) set or a TDD-specific FGIs set, and means for determining features supported by the UE in at least one of a FDD mode or TDD mode, based on the received signaling.

Certain aspects of the present disclosure provide an apparatus for wireless communications capable of communicating in frequency division duplexing (FDD) and time division duplexing (TDD) modes. The apparatus generally includes means for obtaining a FDD-specific feature group indicators (FGIs) set and TDD-specific FGIs set, means for signaling the FGIs set for a current mode of operation by the apparatus, and means for taking at least one action designed to reduce likelihood of transitioning to a mode of operation that is different from the current mode of operation.

Certain aspects of the present disclosure provide an apparatus for wireless communications capable of communicating in frequency division duplexing (FDD) and time division duplexing (TDD) modes. The apparatus generally includes means for obtaining FDD-specific capabilities and TDD-specific capabilities, and means for sending a request to a base station to perform detach and re-attach procedures when changing from a first mode of operation to a second mode of operation, wherein the capabilities corresponding to the second mode of operation is transmitted to the base station during the re-attach procedure.

Certain aspects provide a computer-program product for wireless communications by a user equipment capable of communicating in frequency division duplexing (FDD) and time division duplexing (TDD) modes. The computer-program product typically includes a computer-readable medium having instructions stored thereon, the instructions being executable by one or more processors. The instructions generally include instructions for obtaining a FDD-specific feature group indicators (FGIs) set and a TDD-specific FGIs set, and instructions for signaling at least one of the FDD-specific FGIs set or TDD-specific FGIs set.

Certain aspects provide a computer-program product for wireless communications with a user equipment capable of communicating in frequency division duplexing (FDD) and time division duplexing (TDD) modes. The computer-program product typically includes a computer-readable medium having instructions stored thereon, the instructions being executable by one or more processors. The instructions generally include instructions for receiving signaling of at least one of a FDD-specific feature group indicators (FGIs) set or a TDD-specific FGIs set, and instructions for determining features supported by the UE in at least one of a FDD mode or TDD mode, based on the received signaling.

Certain aspects provide a computer-program product for wireless communications by a user equipment capable of communicating in frequency division duplexing (FDD) and time division duplexing (TDD) modes. The computer-program product typically includes a computer-readable medium having instructions stored thereon, the instructions being executable by one or more processors. The instructions generally include instructions for obtaining a FDD-specific feature group indicators (FGIs) set and TDD-specific FGIs set, instructions for signaling the FGIs set for a current mode of operation by the UE, and instructions for taking at least one action designed to reduce likelihood of transitioning to a mode of operation that is different from the current mode of operation.

Certain aspects provide a computer-program product for wireless communications by a user equipment capable of communicating in frequency division duplexing (FDD) and time division duplexing (TDD) modes. The computer-program product typically includes a computer-readable medium having instructions stored thereon, the instructions being executable by one or more processors. The instructions generally include instructions for obtaining a FDD-specific feature group indicators (FGIs) set and a TDD-specific FGIs set, and instructions for sending a request to a base station to perform detach and re-attach procedures when changing from a first mode of operation to a second mode of operation, wherein a FGIs set corresponding to the second mode of operation is transmitted to the base station during the re-attach procedure.

Certain aspects of the present disclosure provide an apparatus for wireless communications capable of communicating in frequency division duplexing (FDD) and time division duplexing (TDD) modes. The apparatus generally includes at least one processor and a memory coupled to the at least one processor. The at least one processor is configured to obtain a FDD-specific feature group indicators (FGIs) set and a TDD-specific FGIs set, and signal at least one of the FDD-specific FGIs set or TDD-specific FGIs set.

Certain aspects of the present disclosure provide an apparatus for wireless communications with a user equipment capable of communicating in frequency division duplexing (FDD) and time division duplexing (TDD) modes. The apparatus generally includes at least one processor and a memory coupled to the at least one processor. The at least one processor is configured to receive signaling of at least one of a FDD-specific feature group indicators (FGIs) set or a TDD-specific FGIs set, and determine features supported by the UE in at least one of a FDD mode or TDD mode, based on the received signaling.

Certain aspects of the present disclosure provide an apparatus for wireless communications capable of communicating in frequency division duplexing (FDD) and time division duplexing (TDD) modes. The apparatus generally includes at least one processor and a memory coupled to the at least one processor. The at least one processor configured to obtain a FDD-specific feature group indicators (FGIs) set and TDD-specific FGIs set, signal the FGIs set for a current mode of operation by the UE, and take at least one action designed to reduce likelihood of transitioning to a mode of operation that is different from the current mode of operation.

Certain aspects of the present disclosure provide an apparatus for wireless communications capable of communicating in frequency division duplexing (FDD) and time division duplexing (TDD) modes. The apparatus generally includes at least one processor and a memory coupled to the at least one processor. The at least one processor is configured to obtain a FDD-specific feature group indicators (FGIs) set and a TDD-specific FGIs set, and send a request to a base station to perform detach and re-attach procedures when changing from a first mode of operation to a second mode of operation, wherein a FGIs set corresponding to the second mode of operation is transmitted to the base station during the re-attach procedure.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

The techniques described herein can be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network can implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network can implement a radio technology such as Global System for Mobile Communications (GSM). An OFDMA network can implement a radio technology such as Evolved UTRA (E-UTRA), IEEE 802.11, IEEE 802.16, IEEE 802.20, Flash-OFDM, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the techniques are described below for LTE, and LTE terminology is used in portions of the description below.

Single carrier frequency division multiple access (SC-FDMA), which utilizes single carrier modulation and frequency domain equalization is a technique that can be utilized with various aspects described herein. SC-FDMA has similar performance and essentially the same overall complexity as those of an OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for an uplink multiple access scheme in 3GPP Long Term Evolution (LTE), or Evolved UTRA.

Figure 1:
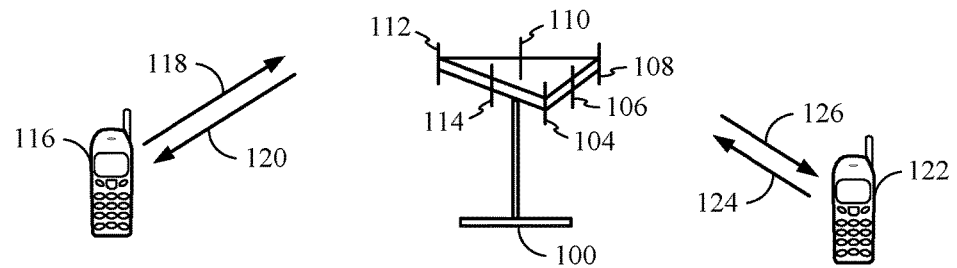
FIG. 1 illustrates a multiple access wireless communication system, in accordance with certain aspects of the present disclosure.

Referring to FIG. 1, a multiple access wireless communication system according to one aspect is illustrated. An access point 100 (AP) includes multiple antenna groups, one including 104 and 106, another including 108 and 110, and an additional including 112 and 114. An access point (AP) may also be referred to as a base station (BS), eNodeB, or simply eNB. In FIG. 1, only two antennas are shown for each antenna group, however, more or fewer antennas can be utilized for each antenna group. Access terminal 116 (AT) is in communication with antennas 112 and 114, where antennas 112 and 114 transmit information to access terminal 116 over forward link 120 and receive information from access terminal 116 over reverse link 118. An access terminal (AT) may also be referred to as a user terminal (UT), mobile station (MS), user equipment (UE), wireless communication device, or some other terminology. Access terminal 122 is in communication with antennas 106 and 108, where antennas 106 and 108 transmit information to access terminal 122 over forward link 126 and receive information from access terminal 122 over reverse link 124. In a frequency division duplex (FDD) system, communication links 118, 120, 124 and 126 can use different frequencies for communication. For example, forward link 120 can use a different frequency than that used by the reverse link 118.

Each group of antennas and/or the area in which they are designed to communicate is often referred to as a sector of the access point. In one aspect, respective antenna groups are designed to communicate with access terminals in a sector of the areas covered by the access point 100.

In communication over forward links 120 and 126, the transmitting antennas of access point 100 may utilize beamforming in order to improve the signal-to-noise ratio of forward links for the different access terminals 116 and 122. Also, an access point using beamforming to transmit to access terminals scattered randomly through its coverage causes less interference to access terminals in neighboring cells than an access point transmitting through a single antenna to all of its access terminals.

Figure 2:
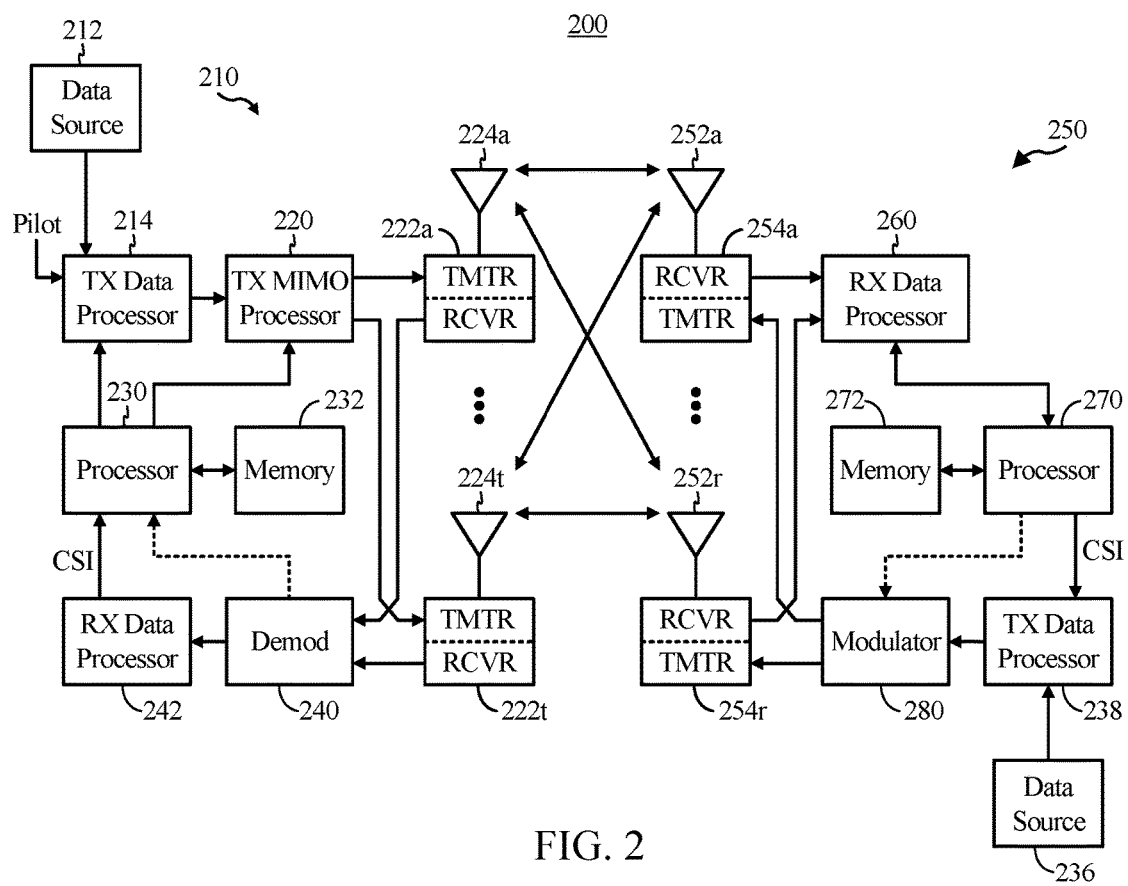
FIG. 2 illustrates a block diagram of a communication system, in accordance with certain aspects of the present disclosure.

FIG. 2 is a block diagram of an aspect of a transmitter system 210 (e.g., an access point) and a receiver system 250 (e.g., an access terminal) in a MIMO system 200. At the transmitter system 210, traffic data for a number of data streams is provided from a data source 212 to a transmit (TX) data processor 214.

In an aspect, each data stream is transmitted over a respective transmit antenna. TX data processor 214 formats, codes, and interleaves the traffic data for each data stream based on a particular coding scheme selected for that data stream to provide coded data.

The coded data for each data stream can be multiplexed with pilot data using OFDM techniques. The pilot data is typically a known data pattern that is processed in a known manner and can be used at the receiver system to estimate the channel response. The multiplexed pilot and coded data for each data stream is then modulated (e.g., symbol mapped) based on a particular modulation scheme selected for that data stream to provide modulation symbols. Examples of modulation schemes may include Binary Phase Shift Keying (BPSK), Quadrature Phase Shift Keying (QPSK), M-PSK, or M-QAM (Quadrature Amplitude Modulation) where M is an integer. The data rate, coding, and modulation for each data stream can be determined by instructions performed by processor 230, which may be coupled with the memory 232.

The modulation symbols for respective data streams are then provided to a TX MIMO processor 220, which can further process the modulation symbols (e.g., for OFDM). TX MIMO processor 220 then provides $N_T$ modulation symbol streams to $N_T$ transmitters (TMTR) 222a through 222t. In certain aspects, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270, which may be coupled with the memory 272, periodically determines which pre-coding matrix to use. Processor 270 formulates a reverse link message comprising a matrix index portion and a rank value portion. The reverse link message can comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

In an aspect, logical channels are classified into Control Channels and Traffic Channels. Logical Control Channels comprise a Broadcast Control Channel (BCCH), which is a downlink (DL) channel for broadcasting system control information; a Paging Control Channel (PCCH), which is a DL channel that transfers paging information; and a Multicast Control Channel (MCCH), which is a point-to-multipoint DL channel used for transmitting Multimedia Broadcast and Multicast Service (MBMS) scheduling and control information for one or several MTCHs. Generally, after establishing an RRC (radio resource control) connection this channel is only used by user equipments (UEs) that receive MBMS (Note: old MCCH+MSCH). Dedicated Control Channel (DCCH) is a point-to-point bi-directional channel that transmits dedicated control information and used by UEs having an RRC connection. In an aspect, Logical Traffic Channels comprise a Dedicated Traffic Channel (DTCH), which is a point-to-point bi-directional channel, dedicated to one UE, for the transfer of user information; and a Multicast Traffic Channel (MTCH), which is a point-to-multipoint DL channel for transmitting traffic data.

In an aspect, Transport Channels are classified into DL and uplink (UL). DL Transport Channels comprise a Broadcast Channel (BCH), Downlink Shared Data Channel (DL-SDCH) and a Paging Channel (PCH), the PCH for support of UE power saving (DRX cycle is indicated by the network to the UE), broadcasted over entire cell and mapped to PHY resources which can be used for other control/traffic channels. The UL Transport Channels comprise a Random Access Channel (RACH), a Request Channel (REQCH), an Uplink Shared Data Channel (UL-SDCH), and a plurality of PHY channels. The PHY channels comprise a set of DL channels and UL channels.

Exemplary Methods and Apparatus for Employing Different Capabilities for Different Duplexing Modes Current 3GPP specifications may define a set of feature group indicators (FGIs), which are signaled by the user equipment (UE) to the network to indicate support or non-support for certain LTE and Inter-Radio Access Technology (I-RAT) features. Examples of such features may include support for handover, performing measurements on another RAT, semi-persistent scheduling and various other features. An example list of definitions for FGIs that may be signaled by a UE may be found in 3GPP 36.331. Based on the signaled FGIs from the UE, the network may not initiate certain procedures towards the UE, since these may not be supported in the UE.

Currently, feature group indicator (FGIs) in the LTE do not specify the mode of operation (e.g., FDD or time division duplex (TDD)) to which they apply. Hence, a UE supporting a certain feature set is, per specification, required to support the full feature set in both FDD and TDD modes of operation. This may be undesired from a product release perspective, because certain features may become available in one mode (e.g., FDD) sooner than in the other mode of operation (e.g., TDD). Hence, according to the specifications, a device that is capable of operating in both FDD and TDD modes may have to restrict feature support to only include features that are supported in both of the duplexing modes of operation.

According to certain aspects of the present disclosure, however, separate groups or sets of capabilities (e.g., feature group indicators (FGIs)) may be defined for different modes of operation (e.g., LTE FDD and LTE TDD). One approach to implement separate groups of FGIs may be to utilize the current set of FGIs (e.g., as defined in the Rel-8 of the LTE standard) (or a slightly modified version thereof) as being applicable only for LTE FDD, while a new set of FGIs may be added specifically for TDD mode. Alternatively, the current set of FGIs (or a slightly modified version thereof) may be defined as being applicable only for LTE TDD mode, while a new set of FGIs may be added specifically for FDD mode. In this manner, for example, a UE may indicate support for TDD and FDD features independently. As a result, a feature that is supported in only one of the modes (e.g., FDD) can be made available earlier, even if the feature is not supported in the other mode (e.g., TDD).

For certain aspects, in order to have separate groups of FGIs for different modes of operation, the entire FGI table (e.g., the table showing correspondence of FGIs and features) may be split in two columns, one corresponding to the LTE TDD and the other corresponding to the LTE FDD mode of operation. The last bit of the FGIs (e.g., the most significant bit, bit number 32) may be used to toggle between the two columns/modes. This may allow the UE, for example, to send information in only one of the columns over the air at any time.

Certain aspects may enable a UE provider to reduce time to market for new handsets (e.g., LTE handsets) that support both FDD and TDD. The proposed method allows a UE to support a wider range of features in one mode without being constrained by the unavailability of those features in the other mode.

Figure 3:
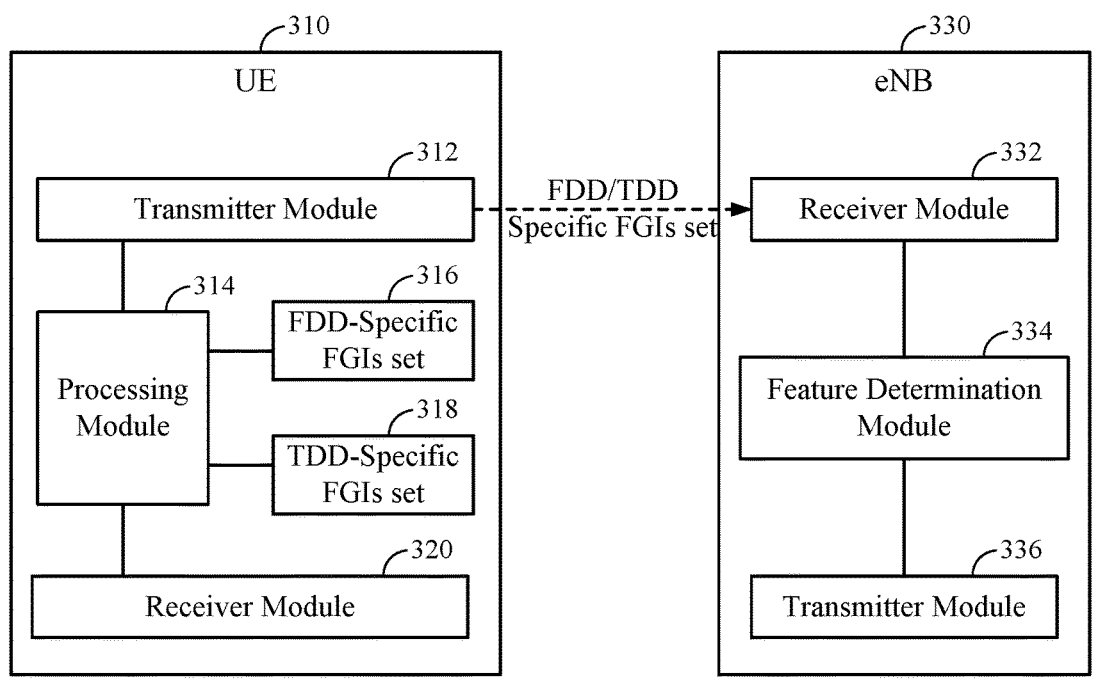
FIG. 3 illustrates an example wireless communication system, in accordance with certain aspects of the present disclosure.

FIG. 3 illustrates a block diagram of an example wireless communications system 300 in which the feature support for TDD and FDD may be decoupled, as presented herein.

System 300 may include one or more UEs (terminals, mobile or wireless stations, and the like), such as UE 310.

The UE 310 may communicate with one or more eNBs 330 (base stations, access points, Node Bs, network cells, and the like) on an uplink and/or downlink. In an aspect, the UE 310 and the eNB 330 can include any number of antennas (not shown) for UL/DL communication within the system 300.

In various wireless communication deployments, respective UEs can be configured with different levels of capability and, in some cases, with different features supported in different operating modes. For example, for an LTE system, the UE 310 may be capable of supporting a first set of features in the TDD mode and a second set of features in the FDD mode. To allow the UE 310 to independently signal these different sets of features, the UE 310 may obtain/maintain a FDD-specific FGIs set 316 and a TDD-specific FGIs set 318. The UE may decide which set of features to signal using a processing module 314. The UE may also include a transmitter module 312 for transmitting the FDD-specific and/or TDD-specific FGIs to the eNB. The receiving module 320 may be used for receiving downlink communications from the eNB.

At any given time, the UE 310 may signal one or both of the mode-specific FGIs to the eNB 330. The eNB 330 may receive the one (or both) of the mode-specific FGIs with a receiver module 332. The eNB may then determine what features are supported by the UE in a given mode (e.g., with a feature determination module 334). In some cases, the eNB may receive only the set of FGIs for a current operating mode, determine what features are available, and initiate procedures for the UE accordingly. According to certain aspects, the eNB may receive signaling of both sets of FGIs and, for example, determine what features are available in both and initiate a transition between modes accordingly. The eNB may also use a transmitter module 336 to transmit signals to the UE 310.

Figure 4:
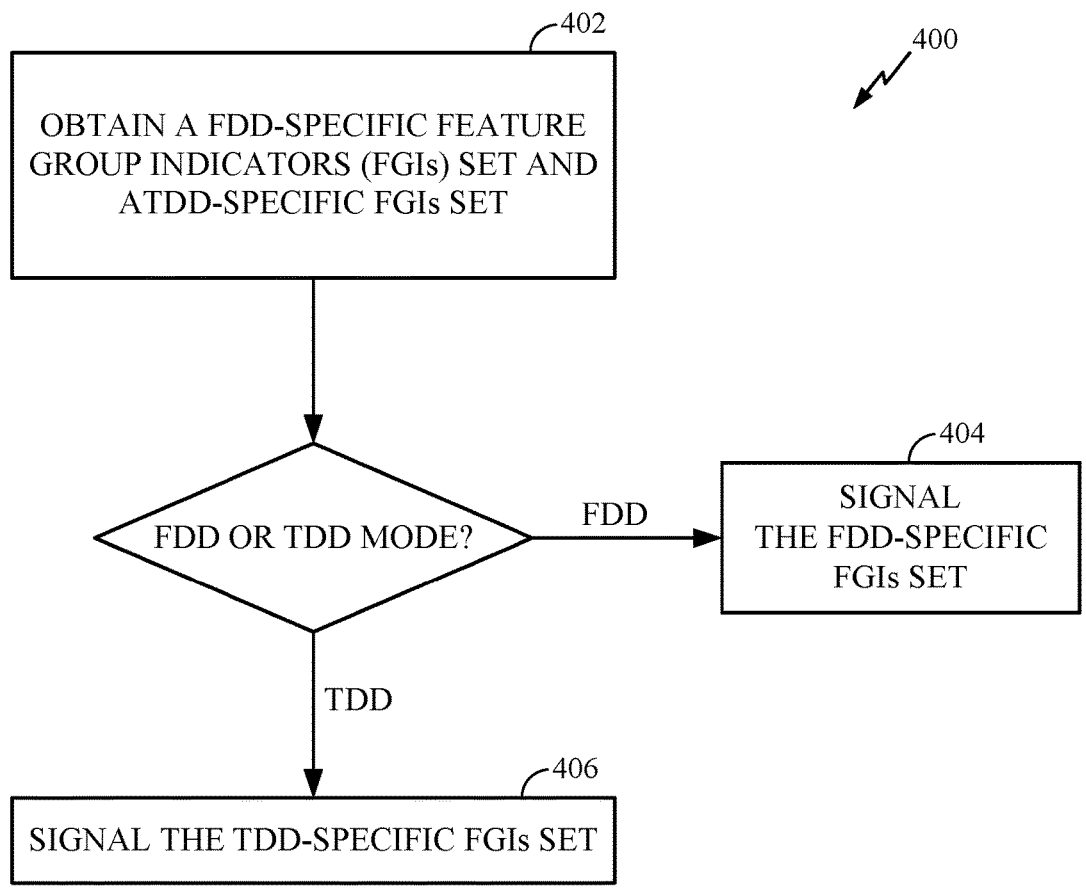
FIG. 4 illustrates example operations that may be performed by a user equipment (UE), in accordance with certain aspects of the present disclosure.

FIG. 4 illustrates example operations that may be performed by a user equipment (UE), such as the receiver system 250, as illustrated in FIG. 2, in accordance with certain aspects of the present disclosure.

The operations 400 begin, at 402, by obtaining a set of TDD specific feature group indicators (FGIs) and set of FDD FGIs. In the illustrated example, if the UE is operating in FDD mode, the UE may signal the FDD-specific FGIs set, at 404. On the other hand, if the UE is operating in TDD mode, the UE may signal the TDD-specific FGIs set, at 406. According to certain aspects, the UE may signal both the TDD-specific FGIs set and FDD-specific FGIs set, regardless of the current duplexing mode.

For certain aspects, the UE may signal the FDD-specific FGIs set or TDD-specific FGIs set as part of a Capability Update procedure.

Figure 5:
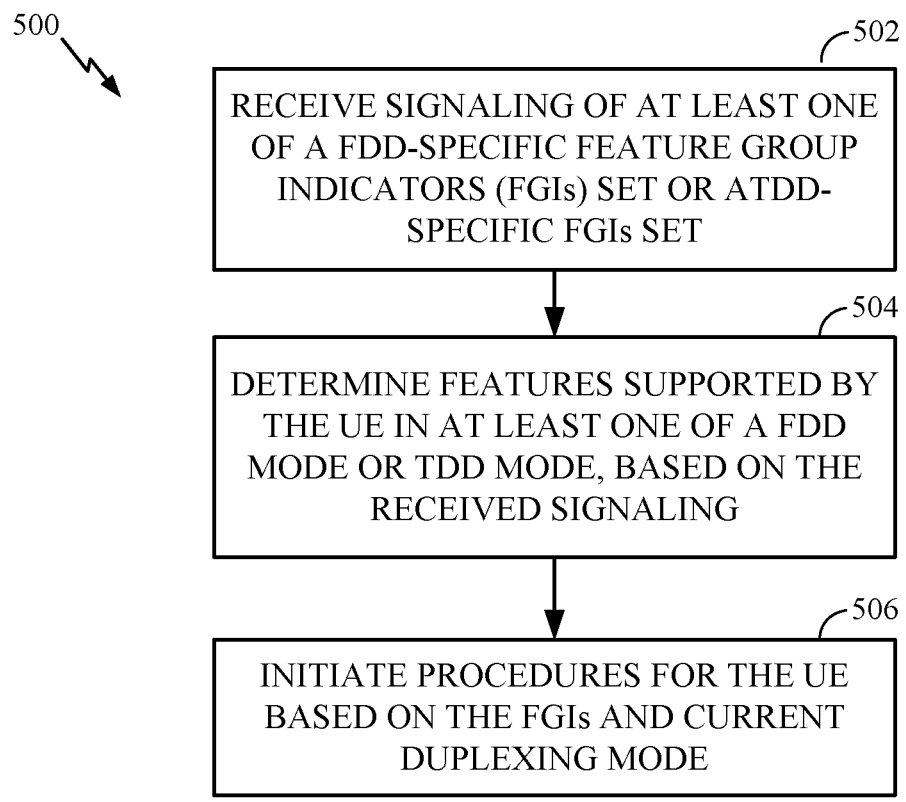
FIG. 5 illustrates example operations that may be performed by a network, in accordance with certain aspects of the present disclosure.

FIG. 5 illustrates example operations that may be performed by a network or an eNB, such as the transmitter system 210, as illustrated in FIG. 2, in accordance with certain aspects of the present disclosure. The operations 500 begin, at 502, by receiving signaling of TDD-specific FGIs set and/or FDD-specific FGIs set from a UE. At 504, a determination of features supported by the UE is made, based on the received FGIs set or sets. At 506, procedures are initiated with the UE, based on the received FGIs set or sets and the features that are supported by the UE.

For certain aspects, the UEs may advertise different sets of features in FDD and TDD modes. However, in the current versions of the LTE standard, the UE capability may only be sent by the UE upon attach. Subsequently, the UE capability may be exchanged directly between the eNBs, even if the eNBs operate in different modes. This means that the eNBs may not request an updated UE capability upon a mode change. Therefore, for certain aspects, the UE may force a UE capability exchange upon a mode change to make sure that the eNBs have the FGIs set related to the new mode of operation. For certain aspects, the UE may force a UE capability exchange (and hence FGIs set exchange) by performing a detach/re-attach procedure, as further described herein.

Initially, the UE may advertize different sets of FGIs for LTE FDD and LTE TDD modes. The mode of operation may be chosen based on the first eNB that the UE has camped on during cell selection on LTE (e.g., when UE tries to find both FDD and TDD systems). Once the mode of operation is chosen, certain aspects of the present disclosure relate to methods and apparatus for reducing and/or preventing mobility between different modes of operation (e.g., LTE FDD to LTE TDD, LTE TDD to LTE FDD, and LTE TDD RAT to UTRAN/1x/HRPD RAT, in which UTRAN stands for Universal Terrestrial Radio Access Network, 1x refers to the CDMA2000 1x, and HRPD stands for high rate packet data). In accordance with certain aspects, while operating in TDD mode, the UE may prune out neighbor FDD frequencies (or frequency bands) in a system information block (e.g., SIB5). The system information block type 5 (SIB5) contains parameters for the configuration of the common physical channels in the cell. Similarly, while operating in FDD mode, the UE may prune out neighbor TDD frequencies in the SIB5.

According to certain aspects, the UE may reduce and/or prevent (e.g., disable) LTE TDD inter-radio access technology (I-RAT) mobility to UTRAN/1x/HRPD during idle mode by pruning out the corresponding frequencies in the SIB6 and SIB8. The system information block type 6 (SIB6) contains parameters for the configuration of the common and shared physical channels to be used in connected mode. The system information block type 8 (SIB8) contains static common packet channel (CPCH) information to be used in the cell.

Certain aspects of the present disclosure relate to methods and apparatus for reducing and/or preventing LTE FDD to LTE TDD and LTE TDD to LTE FDD mobility while the UE is in the active mode. According to certain aspects, while the UE is in LTE FDD mode, the UE may reduce and/or prevent active mode mobility by disabling LTE TDD frequency bands in the UE capability information element (IE). Similarly, while the UE is in LTE TDD mode, the UE may disable LTE FDD frequency bands in the UE capability IE.

According to certain aspects, while in LTE TDD, the UE may reduce and/or prevent active mode LTE TDD IRAT mobility to UTRAN/1x/HRPD by disabling UTRAN/1x/HRPD frequency bands in the UE capability IE.

In case of a mode change, certain aspects of the present disclosure may force the eNB to query for updated UE capability information. If the mode change happened as a result of an out of service/radio link failure (OOS/RLF) based mobility, the UE may force detach/re-attach procedures, so that at least one new FGIs set is exchanged. For certain aspects, a new flag may be added to the service indication application programming interfaces (API) from radio resource control (RRC) connection layer to non-access stratum (NAS) connection layer, indicating if FDD/TDD mode of operation change has happened. The mode change may be indicated by RRC to NAS as soon as the FDD/TDD mode change is detected by the RRC, regardless whether the UE is in idle or connected mode. The RRC may keep track of the current FDD/TDD mode and the FDD/TDD mode that was previously camped on. If the FDD/TDD mode change is indicated to NAS at service indication, the NAS may trigger a detach procedure followed by a re-attach procedure. NAS may also inform data stream (DS) layer to release existing bearer contexts.

For certain aspects, unless the network releases the RRC connection after detach, the UE may use the same RRC connection for the subsequent attach request as per Release 8/9 specifications of the LTE standard (note that a separate RRC connection may be required in Rel-10 of the LTE standard).

For certain aspects, for the out of service (OOS) based mobility, the UE may try to search for service starting with the frequencies/frequency bands of the systems with the same mode (e.g., FDD) as the last successfully camped systems. For example, if the UE last camped on FDD, the UE may begin looking for service on FDD systems. Similarly, if the UE last camped on TDD, the UE may begin looking for service on TDD systems.

For certain aspects, in the event that a detach procedure is triggered, the internet protocol (IP) connectivity may be lost and may need to be re-established. This may result in degraded end-user experience depending on application behavior (e.g., restart of application). For certain aspects, LTE FDD to LTE TDD mobility (and vice versa) may be limited to OOS procedures. Other mobility procedures such as handover, redirections and reselections may not be executed.

Figure 6:
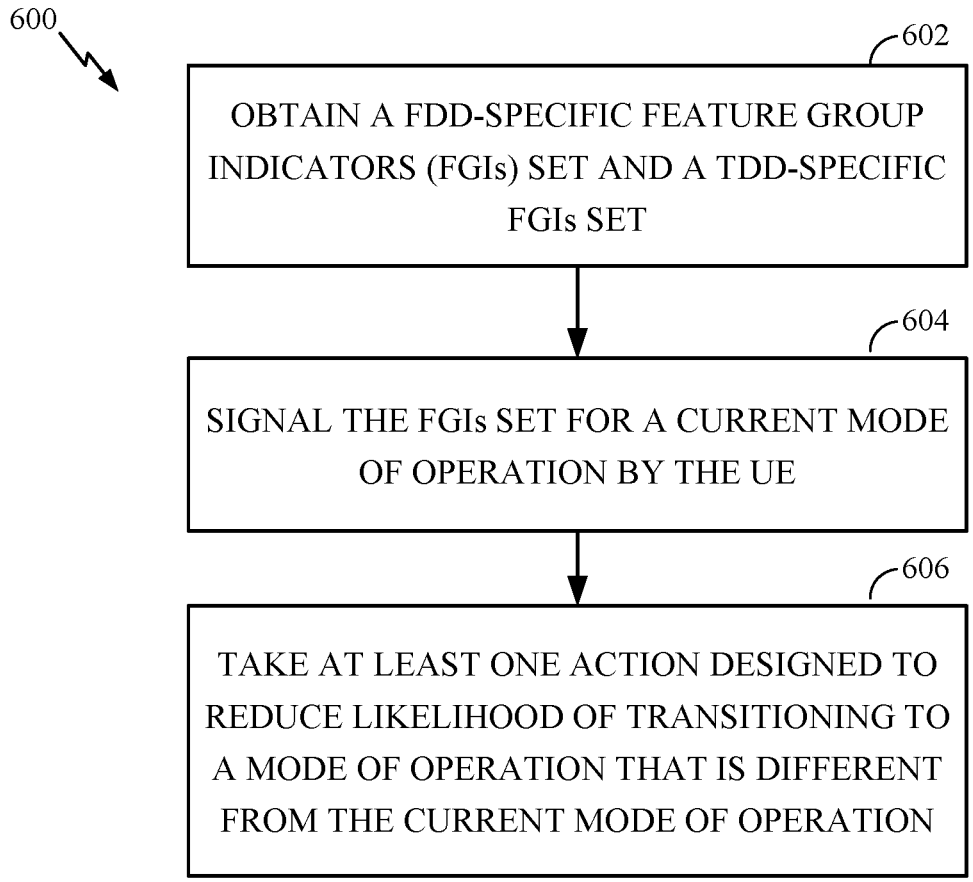
FIG. 6 illustrates example operations that may be performed by a UE, in accordance with certain aspects of the present disclosure.

FIG. 6 illustrates example operations that may be performed by a user equipment (UE), in accordance with certain aspects of the present disclosure. The UE may be a receiver unit 250 as illustrated in FIG. 2 or the UE 310, as illustrated in FIG. 3.

The operations 600 begin at 602 where the UE may obtain a FDD-specific feature group indicators (FGIs) set and TDD-specific FGIs set. At 604, the UE may signal the FGIs set for its current mode of operation. At 606, the UE may take at least one action designed to reduce the likelihood of transitioning to a mode of operation that is different from the current mode of operation. The UE may utilize the processing module 314 to decide which action is suitable.

In some aspects, taking at least one action designed to reduce the likelihood of transitioning may comprise, during an idle mode, ignoring neighbor frequencies for a mode different from the current mode of operation that is broadcasted in a system information block (SIB). In another aspect, taking at least one action may comprise disabling frequency bands for mode of operation that are different from the current mode of operation advertised in a UE capability message. According to another aspect, taking the action may comprise disabling inter-RAT (radio access technology) mobility by disabling frequency bands for one or more RATs advertised in a UE capability message. Taking the action may also comprise taking action to force a base station to query for UE capability. For example, a Non Access Stratum (NAS) connection layer may be notified by a Radio Resource Control (RRC) connection layer of a change from the current mode of operation to a different mode of operation. The NAS connection layer may cause the UE to perform detachment and re-attachment procedures.

In yet another aspect, taking the action may comprise taking action to force a base station to force a detachment and re-attachment procedure, while giving bias to the current mode of operation during the re-attachment procedure.

According to certain aspects, the current mode of operation may comprise a TDD mode and taking at least one action to reduce the likelihood of transitioning to a mode of operation that is different from the current mode of operation may comprise disabling inter-RAT mobility by ignoring frequencies broadcast in at least one system information block (SIB).

According to certain aspects, the current mode of operation may comprise a TDD mode and taking at least one action may comprise disabling inter-RAT (radio access technology) mobility during an active mode and disabling frequency bands for a RAT that is different from a current RAT while in the current mode of operation, in which the frequency bands may be advertised in a UE capability message.

It should be noted that the method described herein may be used temporarily (e.g., to reduce time to market of new handsets). Once the mobility between LTE FDD and TDD is supported, it is expected that LTE FDD and TDD feature sets are also aligned. When the FGIs in both the FDD and TDD are aligned (e.g., each feature is supported in both modes), the UE may only send one set of FGIs that correspond to both FDD and TDD modes of operation.

Figure 7:
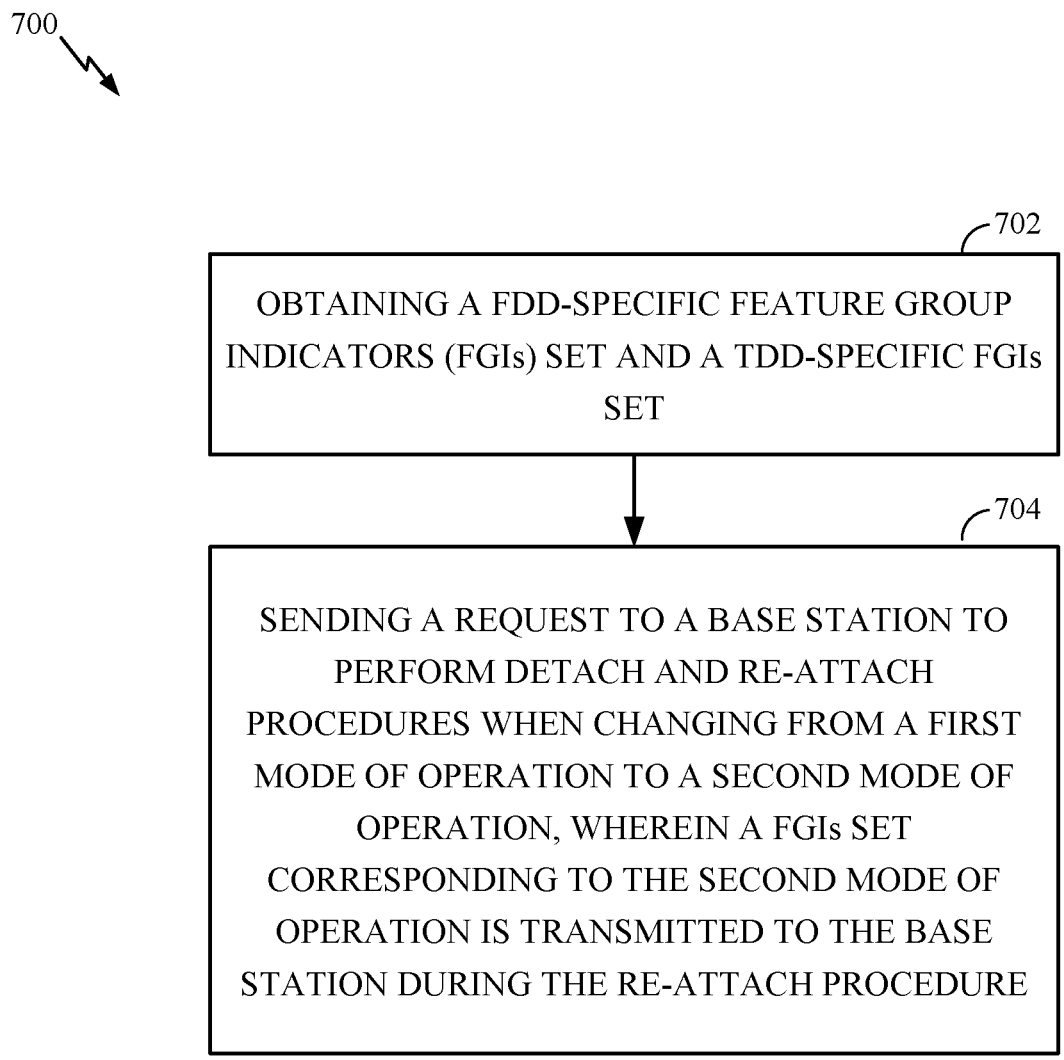
FIG. 7 illustrates alternative example operations that may be performed by a UE, in accordance with certain aspects of the present disclosure.

FIG. 7 illustrates alternative example operations that may be performed by a UE, in accordance with certain aspects of the present disclosure. The UE may be a receiver unit 250 as illustrated in FIG. 2 or the UE 310, as illustrated in FIG. 3.

The operations 700 begin at 702 where the UE may obtain FDD-specific capabilities and TDD-specific capabilities. For certain aspects, the capabilities may include TDD-specific FGIs set and FDD-specific FGIs set. At 704, the UE may send a request to a base station to perform detach and re-attach procedures when changing from a first mode of operation to a second mode of operation. The capabilities corresponding to the second mode of operation are transmitted to the base station during the re-attach procedure. In this manner, the UE may perform detach and re-attach procedures when changing from the first mode of operation to the second mode of operation. As an example, the first mode of operation may be FDD and the second mode of operation may be TDD. The UE may transmit TDD-specific capabilities (e.g., FGIs set) to the base station during the re-attach procedure.

The various operations corresponding to blocks illustrated in the methods of FIGS. 4-7 described above may be performed by various hardware and/or software component(s) and/or module(s).

For example, means for obtaining a FDD-specific FGIs set and TDD-specific FGIs set may be performed by a processor or any suitable processing component, such as the processing module 314, in FIG. 3. Means for signaling at least one of the FDD-specific FGIs set or TDD-specific FGIs set may be performed by a transmitter, such as the transmitter module 312. Similarly, means for taking at least one action may be performed by a processor or any suitable processing component, such as the processing module 314 as illustrated in FIG. 3. In addition, means for receiving signaling may be performed by a receiver, such as the receiver module 332, and means for determining features supported by the UE may be performed by a processing unit, such as the feature determination module 334, as illustrated in FIG. 3. Similarly, means for sending a request to a base station to perform detach and re-attach procedures may be performed by a transmitter, such as the transmitter module 312.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

As used herein, a phrase referring to "at least one of" a list of items refers to any combination of those items, including single members. As an example, "at least one of: a, b, or c" is intended to cover: a, b, c, a-b, a-c, b-c, and a-b-c.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to embodiments of the present disclosure, other and further embodiments of the disclosure may be devised without departing from the basic scope thereof, and the scope thereof is determined by the claims that follow.

The invention claimed is:

1. A method for wireless communications by a user equipment (UE) capable of communicating in frequency division duplexing (FDD) and time division duplexing (TDD) modes, comprising:
   obtaining FDD-specific capabilities and TDD-specific capabilities, wherein the FDD-specific capabilities comprise a set of capabilities supported in FDD that are not supported in TDD, and wherein the TDD-specific capabilities comprise a set of capabilities supported in TDD that are not supported in FDD; and
   sending a request to a base station to perform detach and re-attach procedures when changing from a first mode of operation to a second mode of operation, wherein the FDD-specific capabilities or the TDD-specific capabilities, corresponding to the second mode of operation, are transmitted to the base station during the re-attach procedure.

2. The method of claim 1, further comprising:
   performing the detach and re-attach procedures when changing from the first mode of operation to the second mode of operation.

3. The method of claim 1, wherein the first mode of operation is FDD and the second mode of operation is TDD, wherein the TDD-specific capabilities are transmitted to the base station during the re-attach procedure.

4. The method of claim 1, wherein FDD-specific capabilities comprise FDD-specific Feature group indicators (FGIs) set and TDD-specific capabilities comprise TDD-specific FGIs Set.

5. An apparatus for wireless communications capable of communicating in frequency division duplexing (FDD) and time division duplexing (TDD) modes, comprising:
   means for obtaining FDD-specific capabilities and TDD-specific capabilities, wherein the FDD-specific capabilities comprise a set of capabilities supported in FDD that are not supported in TDD, and wherein the TDD-specific capabilities comprise a set of capabilities supported in TDD that are not supported in FDD; and
   means for sending a request to a base station to perform detach and re-attach procedures when changing from a first mode of operation to a second mode of operation, wherein the FDD-specific capabilities or the TDD-specific capabilities, corresponding to the second mode of operation, are transmitted to the base station during the re-attach procedure.

6. The apparatus of claim 5, further comprising:
means for performing the detach and re-attach procedures when changing from the first mode of operation to the second mode of operation.

7. The apparatus of claim 5, wherein the first mode of operation is FDD and the second mode of operation is TDD, wherein the TDD-specific capabilities are transmitted to the base station during the re-attach procedure.

8. The apparatus of claim 5, wherein FDD-specific capabilities comprise FDD-specific Feature group indicators (FGIs) set and TDD-specific capabilities comprise TDD-specific FGIs Set.

9. A non-transitory computer readable medium having instructions stored thereon, the instructions being executable by one or more processors of a user equipment capable of communicating in frequency division duplexing (FDD) and time division duplexing (TDD) modes and the instructions comprising:
instructions for obtaining FDD-specific capabilities and TDD-specific capabilities, wherein the FDD-specific capabilities comprise a set of capabilities supported in FDD that are not supported in TDD, and wherein the TDD-specific capabilities comprise a set of capabilities supported in TDD that are not supported in FDD; and
instructions for sending a request to a base station to perform detach and re-attach procedures when changing from a first mode of operation to a second mode of operation, wherein the FDD-specific capabilities or the TDD-specific capabilities, corresponding to the second mode of operation, are transmitted to the base station during the re-attach procedure.

10. The computer readable medium of claim 9, further comprising:
instructions for performing the detach and re-attach procedures when changing from the first mode of operation to the second mode of operation.

11. The computer readable medium of claim 9, wherein the first mode of operation is FDD and the second mode of operation is TDD, wherein the TDD-specific capabilities are transmitted to the base station during the re-attach procedure.

12. The computer readable medium of claim 9, wherein FDD-specific capabilities comprise FDD-specific Feature group indicators (FGIs) set and TDD-specific capabilities comprise TDD-specific FGIs Set.

13. An apparatus for wireless communications capable of communicating in frequency division duplexing (FDD) and time division duplexing (TDD) modes, comprising:
at least one processor configured to:
obtain FDD-specific capabilities and TDD-specific capabilities, wherein the FDD-specific capabilities comprise a set of capabilities supported in FDD that are not supported in TDD, and wherein the TDD-specific capabilities comprise a set of capabilities supported in TDD that are not supported in FDD, and
send a request to a base station to perform detach and re-attach procedures when changing from a first mode of operation to a second mode of operation, wherein the FDD-specific capabilities or the TDD-specific capabilities, corresponding to the second mode of operation, are transmitted to the base station during the re-attach procedure; and
a memory coupled to the at least one processor.

14. The apparatus of claim 13, wherein the at least one processor is further configured to:
perform the detach and re-attach procedures when changing from the first mode of operation to the second mode of operation.

15. The apparatus of claim 13, wherein the first mode of operation is FDD and the second mode of operation is TDD, wherein the TDD-specific capabilities are transmitted to the base station during the re-attach procedure.

16. The apparatus of claim 13, wherein FDD-specific capabilities comprise FDD-specific Feature group indicators (FGIs) set and TDD-specific capabilities comprise TDD-specific FGIs Set.

* * * * *